2,088,427

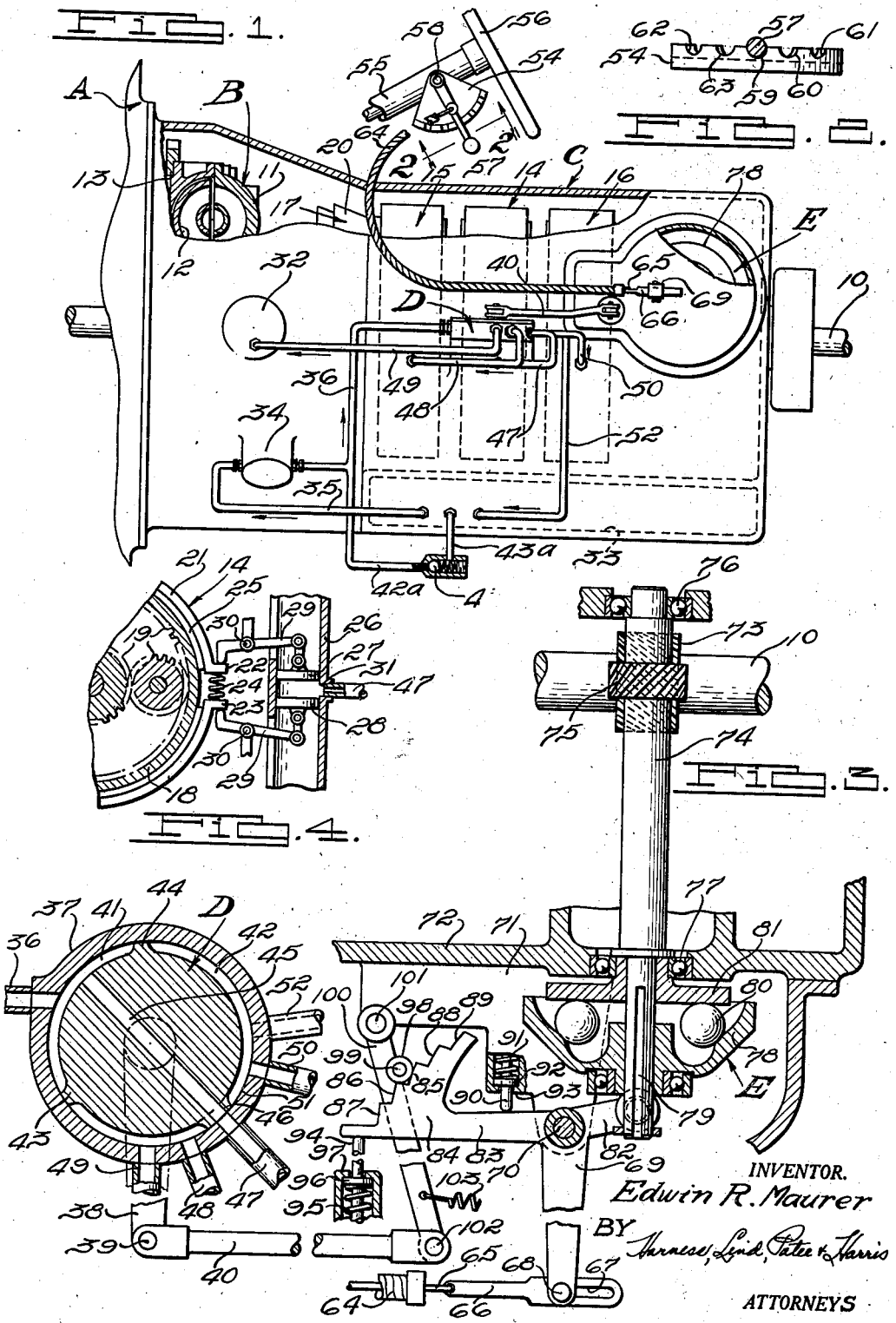
July 27, 1937. E. R. MAURER 2,088,427
MOTOR VEHICLE POWER TRANSMISSION
Filed April 18, 1934
INVENTOR.
Edwin R. Maurer
ATTORNEYS Patented July 27, 1937

UNITED STATES PATENT OFFICE 2,088,427

MOTOR VEHICLE POWER TRANSMISSION

Edwin R. Maurer, Detroit, Mich., assignor to Chrysler Corporation, Detroit, Mich., a corporation of Delaware Application April 18, 1934, Serial No. 721,110

18 Claims. (Cl. 74—262)

This invention relates to motor vehicles and refers more particularly to improvements in means for transmitting power to drive such vehicles.

More particularly, I have provided improvements especially adapted for varying the driving speed ratios of motor vehicles.

It is an object of my invention to provide improvements in motor vehicle transmissions and controls therefor; to provide improved means for operating the various gear trains of a transmission; and to provide relatively simple means for controlling and actuating the various gear ratios of a transmission, capable of manufacture at relatively low cost. While my invention, in the broader aspects thereof, is applicable to various types of transmissions including well-known types of countershaft gear selector transmissions, my invention is particularly related to motor vehicles having speed ratio changing transmissions of the planetary or epicyclic gear type.

A further object of my invention is to provide improved transmission controlling means, especially adapted for use with planetary transmissions, my transmission control operating to establish the various gear ratios with improved positiveness, simplicity, and efficiency.

A further object of my invention, in its more limited aspects, resides in the provision of fluid operating means of improved form and arrangement for controlling the planetary gear sets of a transmission, or other corresponding parts of other types of transmissions. In the broader aspects of my invention, the fluid pressure is preferably provided by a suitable liquid medium such as oil, but the fluid pressure medium may be air under pressure greater or less than atmospheric pressure.

A further object of my invention resides in the provision of improved means for controlling the speed ratios of a transmission, preferably of the planetary gear type, wherein changes in the speed ratios are automatically produced in response to conditions of drive through the transmission. More particularly, I have provided transmission controlling means which is automatically responsive to speeds of the motor vehicle, preferably in combination with means under control of the vehicle driver for manually controlling the action of the automatic gear ratio selecting means.

In carrying out the objects of my invention, I have provided a transmission speed ratio controlling means of the character referred to wherein, under certain desirable conditions of motor vehicle operation, the various transmission gear ratios may be effected in response to manual selection by the vehicle driver, the transmission being manipulated under power in response to the manual selection.

I have further provided means, such as a governor, responsive to speeds of the vehicle for automatically manipulating the transmission under power independently of the manual selection but preferably under control thereof. The control mechanism is preferably arranged so that with the vehicle standing still and the transmission in its neutral or non-drive setting, the drive to the vehicle through the transmission is initially effected in response to actuation of the manually controlled selector means into a forward gear ratio speed setting or into reverse.

In one embodiment of my invention, I have provided for manual selection of the transmission speed ratios at any time to a transmission setting for driving the vehicle slower than the transmission speed ratio setting tending to be produced under the influence of the governor, this manual selection to a speed slower than the governor setting being independent of the governor action at least insofar as transmission speed ratio changes are concerned. The transmission speed ratio produced or tending to be produced by the governor speed is preferably limited by the setting or operation of the manual selector so that the governor cannot operate to produce transmission driving speeds above the speed ratio setting of the manual selector. Furthermore, a setting of the manual selector into a speed ratio higher than that in which the vehicle is being driven at any time leaves the governor free to manipulate the transmission on acceleration thereof into higher driving speeds but limits the action of the governor so as to prevent the governor from manipulating the transmission into speeds higher than the setting of the manual selector.

A planetary type of transmission presents a number of advantages over the more conventional sliding gear types of transmissions, and my invention is therefore primarily directed toward planetary types of transmissions and power transmission systems employing planetary gearing speed ratio controlling devices, although, as aforesaid, the fundamental principles of my invention may, if desired, be employed in connection with transmissions of other types including the aforesaid sliding gear types of transmissions. By way of example in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. This is made possible by reason of the fact that the braking devices associated with the respective planetary gear trains are, in effect, clutches in that each rotary drum controlling a planetary gear train is frictionally engaged by its associated braking means.

Further objects and advantages of my invention will be apparent from the following detailed description of one illustrative embodiment of the principles of my invention, reference being had to the accompanying drawing in which;

Fig. 1 is a side elevational view somewhat diagrammatically illustrating my power transmission mechanism as a whole, parts of the transmission and clutch casings being broken away to illustrate the speed ratio controlling braking devices and the main clutch.

Fig. 2 is a detail side elevational view of the selector segment associated with the manual selecting device, the view being taken along the line 2—2 of Fig. 1.

Fig. 3 is a sectional plan view through the selective speed ratio controlling means or distributor valve and also through the governor controlling mechanism, the section being taken along the line 3—3 of Fig. 1.

Fig. 4 is a fragmentary sectional elevational view somewhat diagrammatic and illustrating one of the planetary transmission speed ratio brake controlling devices, the section being taken along the line 4—4 of Fig. 1.

Referring to the drawing, I have illustrated my invention in connection with a motor vehicle drive, this drive including a prime mover or engine A, a portion of which is shown in Fig. 1, a clutch B driven from the engine, and a change speed transmission or gear box C driven from the clutch B. The drive passes from the transmission through a power take-off shaft 10 which, as usual, may extend rearwardly of the vehicle to drive the usual rear ground wheels (not shown).

The clutch B may be of any suitable construction for controlling the drive between engine A and transmission C, this clutch being illustrated in Fig. 1 in the form of a fluid type having the usual driving and driven vane cooperating members 11 and 12 respectively. The driving vane member 11 is carried by the engine fly-wheel 13 and the driven vane member 12 is secured to the usual power shaft which extends rearwardly to transmission C, this power shaft not being illustrated. I have illustrated a fluid type of clutch since a clutch of this character has a number of advantages in connection with the transmission of the planetary gear type C. Thus, the fluid type of clutch is desirable in providing a smooth drive for the vehicle through the planetary transmission, relatively high power driving efficiency, and other well-known favorable characteristics.

I have illustrated the change speed transmission C as the epicyclic or planetary type, this general form of transmission being well known in the art and, as usual, includes a plurality of transmission speed ratio controlling brakes 14, 15 and 16, these braking devices being respectively adapted to actuate the transmission in its first speed ratio or low gear, second speed ratio, and reverse drive. A further controlling device 17 is illustrated as a clutch of the cone type, adapted to control the transmission for effecting the third speed herein illustrated as the usual direct drive through the transmission.

The brake controlling devices 14, 15 and 16 are adapted to act on transmission elements associated therewith and usually embodied in the form of a rotary drum, one of which is illustrated at 18 in Fig. 4 in association with the transmission controlling brake 14 for the first speed. The form and arrangement of these planetary gear trains are well known in the art and the details thereof are omitted from my disclosure. The brake controlling device 17 is adapted according to customary practice to engage a drum 20 illustrated in Fig. 1 for effecting the direct drive in a well-known manner.

The brake controlling devices 14, 15 and 16 are, for the most part, similar in construction and operation and the following description of the details of the brake device 14 illustrated in Fig. 4 is typical of the other brakes. In Fig. 4 the drum 18 is normally rotated by the planetary gearing 19 associated therewith when the transmission is not in its first speed driving condition, and when rotation of drum 18 is prevented by the braking mechanism associated therewith, then the drive through the transmission takes place for the first speed gear ratio according to well-known practice for planetary gearings of the general type illustrated.

In order to brake the drum 18 I have provided a band 21 around the drum to provide ends 22 and 23 normally separated by a spring 24, the band 21 being provided with a brake lining 25 adapted to contact with the drum when the ends 22 and 23 of the brake band are forced toward each other to contract the band. The band is anchored in any suitable manner (not illustrated) and suitable brake actuating mechanism is provided for each of the bands such as the actuating mechanism illustrated in Fig. 4, for example.

Associated with each of the brake controlling devices 14, 15, and 16 is a cylinder, one of these cylinders being illustrated at 26 in Fig. 4 in association with the brake device 14. This cylinder receives a pair of opposed pistons 27 and 28, the pistons being operably connected to actuate the respective band ends 22 and 23 by suitable links 29 pivotally supported at 30. The cylinder 26 has a fluid pressure inlet 31 adapted to admit fluid such as oil under pressure to the space between pistons 27 and 28 so as to actuate these pistons away from each other as shown in Fig. 4 in contracting the brake band to arrest rotation of the associated controlling drum 18. When the fluid pressure is released, the spring 24 will act to space the brake band 21 from drum 18, pistons 27 and 28 being also restored and the fluid pressure being displaced from the cylinder 26 by way of the opening 31.

The direct speed controlling device 17 is also suitably actuated by fluid pressure introduced to a cylinder illustrated at 32 in Fig. 1, it being understood that this cylinder is adapted to receive one or more pistons actuated by fluid pressure introduced to the cylinder to cause engagement of the cone type drum 20 to effect the third speed or direct drive through the transmission C.

In order to selectively control the supply of fluid under pressure to the actuating mechanism for each of the various speed ratio controlling brakes, I have provided a fluid pressure control and distributing system illustrated in somewhat diagrammatic form in Figs. 1 and 3. The transmission reservoir 33 contains a quantity of fluid such as oil, a pump indicated at 34 being suitably driven so as to draw the oil from the reservoir by a pipe or conduit 35, the oil under pressure being discharged from the pump through a high pressure conduit 36 leading to the valve casing 37 of the selective controlling means herein illustrated in the form of rotary distributing valve means D best shown in Fig. 3. The valve D is adapted for oscillatory adjustment and control by a lever 38 pivotally connected at 39 with an actuating link 40 which, as will be presently apparent, extends to the vehicle speed responsive actuating means or governor E best shown in Fig. 3. A relief valve 41ª may be interposed by pipes 42ª and 43ª between the pressure conduit 36 and reservoir 33 so as to by-pass any excess delivery of pump 34 back to the reservoir.

The valve D cooperates with casing 37 to provide a fluid pressure supply space or chamber 41 and a low pressure space or chamber 42, these chambers being separated from each other by the radially extending valve portions 43 and 44 engaging casing 37. The supply chamber 41 delivers oil under pressure from supply conduit 36 through a passage 45 extending through the valve to a distributing outlet 46 illustrated in Fig. 3 as registering with a conduit 47, the outlet 46 being also adapted for selective alignment with further conduits 48, 49 and 50. The casing 37 has an uninterrupted portion 51 intermediate the conduits 47 and 50 so that when the outlet 46 is adjusted opposite the portion 51, the oil in passage 45 will not escape, this position being the neutral setting of valve D.

The low pressure chamber 42 is continuously open to a conduit 52 which is arranged below the plane of oscillatory movement of outlet 46, the conduit 52 communicating with the reservoir 33 as illustrated in Fig. 1. During movement of valve D, the high pressure chamber 41 is continuously in communication with the oil pressure delivery conduit 36, and the low pressure chamber 42 is continuously in communication with the return conduit 52.

The distributor valve D is adapted to be manually adjusted under certain conditions and the governor action controlled in a novel manner by the vehicle driver and I have illustrated this adjusting or selecting means as comprising a stationary selector segment 54 conveniently mounted to the steering post 55 of the vehicle steering wheel 56, the segment 54 having a plurality of notches, releasable stops or other suitable means for advising the operator of the setting of a hand operated selector lever or element 57 pivotally mounted at 58 in association with the segment 54. These notches further serve to hold the selector lever 57 in any of its positions of manually selective adjustment against displacement under the influence of the speed responsive means acting on the distributor valve D as will be presently apparent. The selector lever 57 has a certain amount of resilience so that when moved by the vehicle driver the lever may be sprung for selective engagement with the various notches of segment 54. Thus, the segment 54 has the notches or stops 59, 60, 61, 62 and 63 respectively adapted, when engaged with selector arm 57, to manipulate transmission C (within certain limitations and conditions which will hereinafter be more apparent) into the first speed gear ratio drive, the second speed, the third or direct speed, reverse drive, and neutral, the latter setting establishing a neutral condition in the transmission whereby there will be no drive therethrough to the take-off shaft 10. The valve D is adapted for actuation by selector arm 57 in a positive manner in one direction of oscillatory movement of valve D by reason of a suitable linkage such as a Bowden wire mechanism 64 which, as illustrated in Fig. 1, is connected at one end to the selector arm 57. The other end of the Bowden wire 64 is connected at 65 to a rod 66 provided with a slot 67 slidably receiving a pin 68 carried at one end of a lever 69. This lever is pivotally supported at 70 to a bracket 71 carried by the casing 72 of transmission C.

The lever 38 is integral with or securely fixed to the valve D at the axis of oscillation of the valve. The slot 67 forms an adjustable stop under control of selector arm 57 preventing clockwise rotation of lever 69 as viewed in Fig. 3. The lever 69 may be mover counterclockwise as viewed in Fig. 3 by a rearward movement of rod 66 under the influence of the selector arm 57 as will be presently apparent. Lever 69 may also be moved forwardly in which instance arm 66 does not move lever 69 by reason of the slot 67 engaging pin 68.

I will next describe the motor vehicle speed responsive controlling means, reference being had particularly to Fig. 3. The power take-off shaft 10 of the transmission is provided with a gear 73 adapted to drive a cross shaft 74 through a gear 75 carried thereby and meshing with the gear 73 adapted to drive a cross shaft 74 through a gear 75 carried thereby and meshing with the gear 73, the shaft 74 being rotatably supported in spaced bearings 76 and 77. The shaft 74 projects through the casing 72 of transmission C and drives the governor E which is provided with the usual cup 78 splined at 79 to the shaft 74. A plurality of centrifugally actuated governor balls 80 operate within cup 78 and against the reaction back plate 81 so that, as the speed of shaft 10 increases, the governor E will be driven through shaft 74 proportionately, the governor balls 80 being thrown outwardly under the action of centrifugal forces to move the cup 78 longitudinally outwardly of the shaft 74. This movement of cup 78 acts on a lever 82 also pivotally supported at 70, the lever having a further lever arm 83 carrying a cam 84 on its outer end.

The cam 84 has a series of spaced notches 85, 86, 87, 88 and 89, these notches being respectively designated as the first speed notch, second speed notch, third or direct speed notch, neutral notch, and reverse notch. It will be noted that these notches are progressively outwardly spaced from pivot 70.

It will be noted that the three levers 69, 82 and 83 are movable as a unit about the pivot 70. Engageable with the lever 83 is a plunger 90 urged toward lever 83 by a spring 91. The plunger 90 is limited in its movement under the influence of spring 91 by engagement of a plunger shoulder 92 with the fixed ledge portion 93 of the bracket 71. The arrangement is such that when lever 83 is in its first speed position as shown in Fig. 3, the plunger 90 is in contact with lever 83 but the lever is not loaded by the spring pressed plunger in such position. When lever 83 is moved clockwise as viewed in Fig. 3 such movement is yieldingly resisted by the plunger 90 which tends to restore lever 83 to its first speed position illustrated in Fig. 3. When lever 83 is moved counterclockwise then the lever moves away from plunger 90, the latter being held against a tendency to follow the lever by reason of the aforesaid shoulder 92 and ledge 93.

Associated with lever 83 is a second plunger 94 which opposes the plunger 90 in acting on the lever. Thus, plunger 94 is yieldingly urged toward lever 83 by a spring 95, the plunger having a shoulder 96 which acts against a ledge or stop 97 so that when the lever 83 is in the first speed position the plunger 94 engages lever 83 but does not load this lever. The arrangement is such that when lever 83 is moved counterclockwise from the position illustrated in Fig. 3, such movement is yieldingly opposed by the spring loaded plunger 94 which tends to yieldingly restore lever 83 to its first speed position. With lever 83 positioned as illustrated in Fig. 3, plungers 90 and 94 tend to yieldingly maintain the lever in this position, one plunger or the other yieldingly opposing movement in either of its directions of rotation about the pivot 70.

The inner surface of governor cup 78 may be suitably shaped so as to actuate cam 84 and distributor valve D at the desired speeds of motor vehicle travel, within the conditions imposed by the mechanism, it being noted that in Fig. 3 the governor balls 80 are illustrated in their position of actuation corresponding to first speed.

Engageable with cam 84 is a roller 98 mounted on a pin 99 carried by a lever 100 pivotally supported at 101 to the bracket 71. The lever 100 extends outwardly for pivotal connection at 102 with the aforesaid arm 40. Acting on the lever 100 and tending to move the same in a counterclockwise direction about the pivot 101 is a spring 103 connected at one end thereof to the lever and having its other end suitably anchored to a fixed part of the mechanism. It will be noted that the notches of cam 84 have faces engaged by roller 98, these faces being portions of concentric arcs centered at the pivot point 70, it being apparent that spring 103 will not move lever 100 until cam 84 has been actuated in a counterclockwise direction, it being apparent that roller 98 is carried about the pivot 101 so that the roller is wedged against premature movement in response to the actuation of spring 103. When the cam 84 is moved in a clockwise direction, the roller 98 is caused to engage another of the cam notches tending to move lever 100 in a clockwise direction against the opposition of spring 103 and thereby impart clockwise rotation to the valve D.

In the operation of my power transmission mechanism, let it be presumed that the parts are positioned for operation in the first speed setting of the transmission as illustrated in Figs. 1 to 4 inclusive. With the parts in this position the distributor valve D has its fluid distributing outlet 46 aligned with the first speed conduit 47 so as to supply fluid under pressure to the first speed brake controlling device 14 illustrated in Fig. 4. In Fig. 4 the braking device is shown in its operative position whereby the drum 18 is held against rotation by the brake band 21 which is contracted by the action of the fluid pressure admitted from conduit 47 to separate pistons 27 and 28. Under such conditions the transmission is operating in the first speed ratio so that the power take-off shaft 10 is driven in low gear.

Where the first speed drive was reached from a neutral condition of transmission C, this first speed drive is obtained by manual movement of selector arm 57 from the neutral notch 63 of selector segment 64 to engagement with the first speed notch 59. When the selector arm 57 is engaged with the neutral notch 63, the cam notch 88 is engaged with roller 98 and the distributor valve outlet 86 is positioned opposite the neutral space 51 of the valve casing 37 so that fluid pressure is not being delivered to any of the speed ratio controlling brake devices of the transmission. Also, when cam 84 is positioned for neutral the plunger 94 is acting on the cam by reason of spring 95 and tending to restore the cam to the first speed position thereof.

When selector arm 57 is thus moved from neutral notch 63 to the first speed notch 59, the rod 66 is moved forwardly, such movement permitting plunger 94 to rotate cam 84 into the position shown in Fig. 3, the pin 68 carried by lever 69 operating in slot 67 during this swinging movement of the cam. When the cam 84 is thus moved, roller 98 causes lever 100 to move sufficiently to align the fluid outlet 46 with the first speed conduit 47. As soon as fluid under pressure is delivered through the conduit 47, the first speed braking device 14 is actuated as aforesaid and the motor vehicle is driven in its low gear.

As the vehicle is driven in its first speed, the governor balls 80 will be actuated under the influence of centrifugal force at a desired predetermined speed, the governor balls tending to move outwardly so as to swing cam 84 clockwise. However, if the selector arm 57 is left in engagement with the first speed notch 59, it is apparent that the governor E cannot operate to move cam 84 inasmuch as arm 66 provides an abutment for the lever 69 which moves with cam 84.

Let it be presumed that with the selector arm 57 in engagement with the neutral notch 63, the operator moves the selector arm into engagement with the third speed notch 61. The distributor valve D does not respond to such movement of the selector arm, rod 66 being moved forwardly so that the slot 67 will lie ahead of pin 68 instead of rearwardly thereof. However, the distributor valve will be actuated to its first speed position under the influence of plunger 94 in a manner similar to that previously described. When cam 84 is thus moved in response to actuation of plunger 94, the cam is brought to rest in its first speed position by reason of plunger 94 being held against further movement by the shoulder 96. Thus, in the foregoing illustration it will be apparent that the distributor valve D is positioned to supply fluid under pressure to the first speed conduit 47 and the motor vehicle may be accelerated in its first speed until, at a predetermined speed of vehicle drive and R. P. M. of shaft 74, the governor balls 80 will suddenly act to actuate lever 82 to swing cam 84 to cause roller 98 to engage the second speed notch 86. Such movement will act through lever 100 to further rotate the distributor valve so as to align the fluid outlet 46 with the second speed conduit 48.

When the distributor valve is thus moved, it will be apparent that the first speed conduit 47 is opened to the low pressure chamber 42 and the spring 24 associated with the first speed braking device 14 will move pistons 27, 28 toward each other, the fluid displaced thereby returning through conduit 47 and thence to the reservoir 33 by reason of the return conduit 52. Meantime, the fluid pressure being supplied to the second speed conduit 48 causes the second speed braking device 15 to be energized so as to produce a drive in the second speed gear ratio. In similar manner, on further acceleration of the motor vehicle to a higher speed, the governor balls 80 will respond at a predetermined desired R. P. M. of shaft 74 to further actuate cam 84 so as to position roller 98 in engagement with the third speed cam notch 87 so as to release the second speed brake controlling device 15 and to supply fluid under pressure through the third speed conduit 49 to cause actuation of the braking device 17 for producing a direct drive through the transmission to the motor vehicle.

If, instead of the operator moving the selector arm 57 from neutral notch 63 to the third speed notch 61, he adjusts the selector arm from neutral notch 63 to the second speed notch 60, it will be apparent that rod 66 will not be moved forwardly to the same extent and the governor E will not be able to rotate cam 84 beyond the engagement of second speed notch 86 with the roller 98. In this manner it will be apparent that the position of the selector arm 57 determines the limit to which the governor will automatically actuate the distributor valve for one direction of oscillatory movement thereof. I have thus provided a manual controlling device for the governor for limiting governor actuation toward higher speed ratios.

It will be apparent that when the transmission is being operated in response to actuation of the governor, the transmission will be automatically manipulated into lower speed ratios when the motor vehicle is slowed down sufficiently to permit the governor balls 80 to retract. Thus, for example, let it be presumed that the selector arm 57 has been adjusted to the third speed notch 61 and that the motor vehicle has been accelerated so that the car is being driven in the direct drive. When the motor vehicle encounters a steep grade sufficient to materially reduce its speed or where the motor vehicle speed is retarded for any other reason, the plunger 90 will act on lever 83 to rotate cam 84 into its position for engaging the next adjacent notch with roller 98 where the retardation is gradual, spring 103 causing lever 100 to maintain roller 98 in engagement with the cam and to thereby rotate the distributor valve in a counterclockwise direction. In this manner the transmission may be automatically manipulated into its second speed drive from a direct driving condition. Where the motor vehicle is very suddenly retarded, it will be apparent that in some instances the roller 98 will quickly move from engagement with the third speed notch 87 to the first speed notch 85 but will not move further into the neutral position by reason of pin 68 acting at the end of slot 67 and also by reason of the fact that cam 84 is in its first speed position plungers 94 and 90 are not further acting on lever 83.

On retardation of the motor vehicle to the first speed setting where the selector arm 57 is in engagement with the first speed notch 59 or with notches 60 or 61, the motor vehicle may be brought to rest with the first speed setting maintained by reason of the slippage provided in the fluid clutch B. Where a clutch of the fluid type is not used, it will be apparent that the main engine clutch between the engine and transmission may be released either manually or automatically as desired so that the engine A may be idled with the motor vehicle brought to rest. After the motor vehicle is brought to rest by the application of the usual wheel brake mechanism (not shown) further acceleration of the motor vehicle may be produced by depressing the usual accelerator pedal or opening the usual engine throttle in any suitable manner, the fluid clutch being thereby energized sufficiently to transmit the drive to the transmission for driving in the first speed. Further acceleration of the motor vehicle in higher speed ratios is obtained in a manner similar to that previously described.

It is furthermore apparent that the selector arm 57 may be at any time adjusted to a speed ratio lower than that obtained under the influence of governor E. Thus, for example, let it be presumed that the motor vehicle is being driven under the influence of governor E in the third speed position where the fluid outlet 46 is aligned with the third speed conduit 49, the selector arm 57 having been manipulated into engagement with the third speed notch 61. Let it now be presumed that the motor vehicle driver desires to manipulate the transmission into the first speed setting in advance of the motor vehicle speed which would normally cause governor E to actuate the valve D into the first speed setting. In order to obtain such action, the vehicle operator moves the selector arm 57 into engagement with notch 59, the arm 66 swinging lever 69 and cam 84 in a counterclockwise direction against the influence of governor E so as to cause the roller 98 to engage the first speed notch 85. The spring 103 will maintain roller 98 in engagement with cam 84 so as to align the valve outlet 46 with the first speed conduit 47 as will be readily understood. It is thus apparent that the operator may at any time manipulate the transmission into any speed ratio lower than that produced at any time under the action of governor E and furthermore that the governor E will automatically manipulate the transmission through the desired speed ratios although the setting of the selector arm 57 will determine the upper limit of movement in the scale of the speed ratios in response to governor action.

The rod 66 will swing the lever 69 and cam 84 in a counterclockwise direction so as to bring the reversing cam notch 89 into position to be received by the roller 98. During this cam movement the plunger 94 will be moved to additionally compress the spring 95 associated therewith and lever 100 will be moved by spring 103 so as to rotate the distributor valve D to align the fluid outlet 46 with the reversing conduit 50 in order to supply fluid under pressure to actuate the reversing brake controlling device 16. The motor vehicle may then be driven in reverse and from the reverse setting the transmission may be manipulated into the neutral or first speed setting by manual adjustment of the selector arm 57 into the respective notches 63 or 59. When such adjustment of the selector arm takes place, the cam 84 will be caused to follow the movement of rod 66 by reason of the plunger 94, it being understood that the spring 95 has sufficient strength to return cam 84 to the neutral and to the first speed setting and to thereby overcome the resistance of spring 103.

The governor cup 78 is so designed that when the cam 84 is swung in a counterclockwise direction as viewed in Fig. 3, the necessary clearance for movement of the governor cup is afforded for the governor balls 80 as will be readily understood. Thus, in Fig. 3 the governor balls 80 are illustrated for their positions of adjusting cup 78 for engaging the first speed cam notch 85 with roller 98. If the motor vehicle is brought to rest, the governor balls 80 will move inwardly toward shaft 74 and the cam 84 may be moved counterclockwise into either the neutral setting or the reverse setting by actuation of the selector arm 57 acting through the Bowden mechanism 64, rod 66 and lever 69.

The cam 84 and the control notches associated therewith serve to hold the roller 98 in engagement with one of the notches until the governor stores a certain amount of energy necessary to quickly move the cam to engage roller 98 with another notch. By reason of this arrangement, the changes in the gear ratios are made to quickly take place with a positive action as distinguished from a gradual rotative movement of the distributor valve.

Various modifications and changes will be readily apparent from the teachings of my invention, as set forth in the appended claims, and it is not my intention to limit my invention to the particular details of construction and operation shown and described for illustrative purposes.

What I claim is:

1. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means, a manually contacted adjustable selector element, and manually actuated means actuated in response to manual adjustment of said selector element for operating said selective controlling means to selectively provide a plurality of forward driving speed ratios and reverse independently of operation of said speed responsive means but only for effecting one or more forward driving speed ratios providing motor vehicle drive slower than the speed ratio tending to be effected under the operation of said speed responsive means, said speed responsive means being adapted to operate said selective controlling means independently of said manually actuated means for effecting one or more speed ratios providing motor vehicle drive slower than the speed ratio setting of said manually actuated means, said manually actuated means including a stop adapted to prevent operation of the speed responsive means tending to effect one or more speed ratios providing motor vehicle drive faster than the speed ratio setting of said manually actuated means.

2. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means to provide increasing and decreasing speed ratio drives, manually actuated means including a manually contacted selector element for operating said selective controlling means independently of the operation of said speed responsive means but only for effecting one or more speed ratios providing motor vehicle drive slower than the speed ratio tending to be effected under the operation of said speed responsive means, said speed responsive means being adapted to operate said selective controlling means independently of said manually actuated means for effecting one or more speed ratios providing motor vehicle drive slower than the speed ratio setting of said manually actuated means, said manually actuated means including a stop adapted to prevent operation of the speed responsive means tending to effect one or more speed ratios providing motor vehicle drive faster than the speed ratio setting of said manually actuated means and means operated in response to manual adjustment of said manually adjustable selector element to effect actuation of one of said controlling devices for initially accelerating the vehicle.

3. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means, a manually contacted adjustable selector element, and manually actuated means actuated in response to manual adjustment of said selector element for operating said selective controlling means to selectively provide a plurality of forward driving speed ratios and reverse independently of the operation of said speed responsive means but only for effecting one or more forward driving speed ratios providing motor vehicle drive slower than the speed ratio tending to be effected under the operation of said speed responsive means, said manually actuated means limiting operation of said speed responsive means on acceleration of said motor vehicle, said speed responsive means operating to effect decreasing and increasing speed ratios within said limit established by said manually actuated means.

4. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means, a manually contacted adjustable selector element, and manually actuated means actuated in response to manual adjustment of said selector element for operating said selective controlling means to selectively provide a plurality of forward driving speed ratios and reverse independently of the operation of said speed responsive means, said manually actuated means limiting operation of said speed responsive means on acceleration of said motor vehicle, said speed responsive means operating to effect decreasing and increasing speed ratios within said limit established by said manually actuated means.

5. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means whereby to increase and decrease the driving speed ratio of the transmission in response to acceleration and retardation of the motor vehicle, a manually contacted adjustable selector element, and manually actuated means actuated in response to manual adjustment of said selector element for operating said selective controlling means to selectively provide a plurality of forward driving speed ratios and reverse independently of the operation of said speed responsive means, said manually actuated means including a stop adjustable by manual movement of said selector element for limiting operation of said speed responsive means on acceleration of said motor vehicle.

6. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means whereby to increase and decrease the driving speed ratio of the transmission in response to acceleration and retardation of the motor vehicle, a manually adjustable selector element, and mechanism operated in response to adjustment of said selector element to effect driving of the vehicle in low, high and reverse speeds, said mechanism including a stop adjustably operated by said selector element through the intermediary of said mechanism for limiting operation of said speed responsive means on acceleration of said motor vehicle.

7. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means whereby to increase and decrease the driving speed ratio of the transmission in response to acceleration and retardation of the motor vehicle, a manually contacted adjustable selector element, and manually actuated means actuated in response to manual adjustment of said selector element for operating said selective controlling means to selectively provide a plurality of forward driving speed ratios and reverse independently of the operation of said speed responsive means but only for effecting one or more decreasing driving speed ratios of the transmission.

8. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means whereby to increase and decrease the forward driving speed ratio of the transmission in response to acceleration and retardation of the motor vehicle, manually operable means acting on said speed responsive means for operating said selective controlling means for neutral setting of the transmission, and yielding means acting throughout the selective operation of said selective controlling means including said neutral setting of said selective controlling means to urge said speed responsive means in a position for operating said selective controlling means to effect one of said forward driving speed ratios through said transmission.

9. In a motor vehicle power transmission having a plurality of speed ratio controlling devices providing a plurality of forward drives and reverse, power operated means for actuating said controlling devices, means controlling said power operated means for effecting selective actuation of said controlling devices, means responsive to motor vehicle speed for operating said selective controlling means whereby to increase and decrease the forward driving speed ratio of the transmission in response to acceleration and retardation of the motor vehicle, manually operable means acting on said speed responsive means for operating said selective controlling means for neutral and for reverse settings of the transmission, yielding means acting throughout the selective operation of said selective controlling means including said neutral and reverse settings of said selective controlling means to urge said speed responsive means in a position for effecting one of said forward drives through said transmission.

10. In a motor vehicle power transmission having a plurality of speed ratio controlling devices for forward and reverse drives, power operated means for actuating said controlling devices, means controlling said power operated means for effecting selective actuation of said controlling devices, means responsive to motor vehicle speed for operating said selective controlling means whereby to increase and decrease the driving speed ratio of the transmission in response to acceleration and retardation of the motor vehicle, and yielding means acting throughout the selective operation of said selective controlling means including the operation thereof for said reverse drive to urge said speed responsive means in a position for effecting a forward drive in low speed ratio through said transmission.

11. In a motor vehicle planetary gear transmission having a plurality of speed ratio braking devices providing a plurality of forward speeds, reverse and neutral, power means for actuating said braking devices, vehicle speed responsive means controlling said power means to progressively actuate said forward speed ratio braking devices, and manually actuated means acting on said speed responsive means to control said power means independently of said control thereof in response to vehicle speed, said manually actuated means including a manually adjustable selector element having a plurality of separate stations of selective adjustment for respectively providing said forward and reverse speeds and neutral, said manually actuated means further including a member operably connected to said selector element for limiting operation of said speed responsive means on acceleration of said motor vehicle in its forward drive.

12. In a motor vehicle planetary gear transmission having a plurality of speed ratio fluid pressure operated braking devices providing a plurality of forward speeds, reverse and neutral, distributor valve means for selectively supplying fluid pressure to actuate said braking devices, governor controlled means for operating said distributor valve means in response to vehicle speed, and manually actuated means acting on said governor controlled means for operating said distributor valve means, said manually actuated means including a manually adjustable selector element having a plurality of separate stations of selective adjustment for respectively providing said forward and reverse speeds and neutral, said manually actuated means further including a member operably connected to said selector element for limiting operation of said speed responsive means on acceleration of said motor vehicle.

13. In a motor vehicle planetary gear transmission having a plurality of speed ratio fluid pressure operated braking devices providing a plurality of forward speeds, reverse and neutral, distributor valve means for selectively supplying fluid pressure to actuate said braking devices, governor controlled means for operating said distributor valve means selectively in opposite directions of movement respectively in response to increasing and decreasing vehicle speeds, and manually actuated means for operating said distributor valve means independently of the vehicle speed and in only one of said directions of movement for effecting a reduction in the vehicle driving speed ratio, said manually actuated means including a manually adjustable selector element having a plurality of separate stations of selective adjustment for respectively providing said forward and reverse speeds and neutral.

14. In an engine driven vehicle including a planetary gear transmission having a plurality of speed ratio braking devices providing a plurality of forward speeds, reverse and neutral, means responsive to predetermined increments of vehicle speed variation for selectively operating said forward speed ratio braking devices, and manually actuated means for varying said increments of vehicle speed response, said manually actuated means including a manually adjustable selector element having a plurality of separate stations of selective adjustment for respectively providing said forward and reverse speeds and neutral, said manually actuated means further including a member operably connected to said selector member for limiting operation of said speed responsive means on acceleration of the motor vehicle in its forward drive.

15. In a motor vehicle power transmission having a plurality of speed ratio controlling devices providing a plurality of forward speeds, reverse and neutral, a plurality of fluid pressure operated means for respectively actuating said controlling devices, distributor valve means adjustable to a plurality of positions for selectively supplying fluid pressure to said fluid pressure operated means, governor means actuated in response to the speed of the vehicle, control means operated by the governor, means actuated by said governor control means for adjusting said distributor valve means, and manually actuated means for limiting said adjustment under the influence of said governor control means for increasing motor vehicle speed, said manually actuated means including a manually adjustable selector element having a plurality of separate stations of selective adjustment for respectively providing said forward and reverse speeds and neutral.

16. In a motor vehicle planetary gear transmission having a plurality of fluid pressure operated speed ratio braking devices, a fluid reservoir, a pump, means including an adjustable distributer valve for selectively applying fluid under pressure from said reservoir and pump to actuate said braking devices and for returning the fluid from said braking devices to said reservoir, means acting on said distributer valve and adapted for selective movement to a plurality of positions of transmission forward, reverse, and neutral conditions of control whereby to effect corresponding adjustment of said distributer valve, manually controlled means for selectively moving said distributer valve adjusting means to said positions of control and including a plurality of positions of forward speed ratio drives for the vehicle, vehicle speed responsive means for selectively moving said distributer valve adjusting means under control of said manually controlled means to effect an increase and decrease in the driving speed ratio of the transmission in response to acceleration and retardation of the motor vehicle, said distributer valve actuating means including an element operably connected to said speed responsive means and to said manually controlled means, and opposing springs acting on said element tending to adjust said distributer valve to a position of forward drive through the transmission.

17. In a motor vehicle transmission having a plurality of speed ratio controlling devices providing a plurality of forward drives, reverse and neutral, power operated selector means for selectively operating said devices, vehicle speed responsive means operably connected to said power operated means and including an actuating member having a plurality of separate positions of movement for control of said power means and respectively corresponding to said forward drives, reverse and neutral, a manually adjustable selector element having a plurality of separate positions of adjustment respectively corresponding to said forward drives, reverse and neutral, lost motion means operably connecting said selector element to said actuating member and adapted to positively move said actuating member selectively from one of its said forward drive positions of movement to its said positions of neutral and reverse, and yielding means acting on said actuating member when moved to its said positions of neutral and reverse for urging movement of said actuating member toward one of its said forward drive positions.

18. In a motor vehicle transmission having a plurality of speed ratio controlling devices providing a plurality of forward drives, reverse and neutral, power operated selector means for selectively operating said devices, vehicle speed responsive means operably connected to said power operated means and including an actuating member having a plurality of separate positions of movement for control of said power means and respectively corresponding to said forward drives, reverse and neutral, a manually adjustable selector element having a plurality of separate positions of adjustment respectively corresponding to said forward drives, reverse and neutral, lost motion means operably connecting said selector element to said actuating member and adapted to positively move said actuating member selectively from one of its said forward drive positions of movement to its said positions of neutral and reverse, and means yieldingly acting on said actuating member to yieldingly resist movement thereof from one of its forward drive controlling positions toward a position of faster forward drive control and toward positions of neutral and reverse drive control.

EDWIN R. MAURER.